United States Patent

[11] 3,561,729

| [72] | Inventor | William E. Politz |
| | | Delphi, Ind. |
| [21] | Appl. No. | 764,568 |
| [22] | Filed | Oct. 2, 1968 |
| [45] | Patented | Feb. 9, 1971 |
| [73] | Assignee | Stephen A. Young |
| | | Monticello, Ind. |

[54] CARTRIDGE TYPE VALVE INCLUDING STEM, BONNET AND SEAT
6 Claims, 9 Drawing Figs.

[52] U.S. Cl. .................................................. 251/287, 251/304
[51] Int. Cl. ...................................................... F16k 5/00
[50] Field of Search ........................................... 251/287, 288; 137/625.41, 625.15, 625.21, 625.31

[56] References Cited
UNITED STATES PATENTS

| 796,252 | 8/1905 | Ross et al. ...................... | 137/625.15 |
| 949,044 | 2/1910 | Ross et al. ...................... | 137/625.41 |
| 1,315,741 | 9/1919 | Pranold .......................... | 251/287 |
| 3,009,679 | 11/1961 | Williams ........................ | 251/287X |
| 3,014,489 | 12/1961 | Lamp et al. ................... | 137/625.15X |

FOREIGN PATENTS

| 1,027,947 | 4/1958 | Germany ...................... | 137/625.41 |

*Primary Examiner*—M. Cary Nelson
*Assistant Examiner*—Michael O. Sturm
*Attorney*—Robb and Robb ABSTRACT: This invention consists of valve structure, primarily structure useful in regulating water flow in domestic or like applications, and involves the provision of a stem, bonnet and seat arrangement in which the elements enumerated are included in a single unit, replaceable in and removable from a valve body. The flow control is effected by relative rotation of discs or disc elements having passages therethrough which are brought into alignment, a single passage through the stem providing for direction of flow from an inlet to an outlet through the sealing and seat means.

PATENTED FEB 9 1971
3,561,729
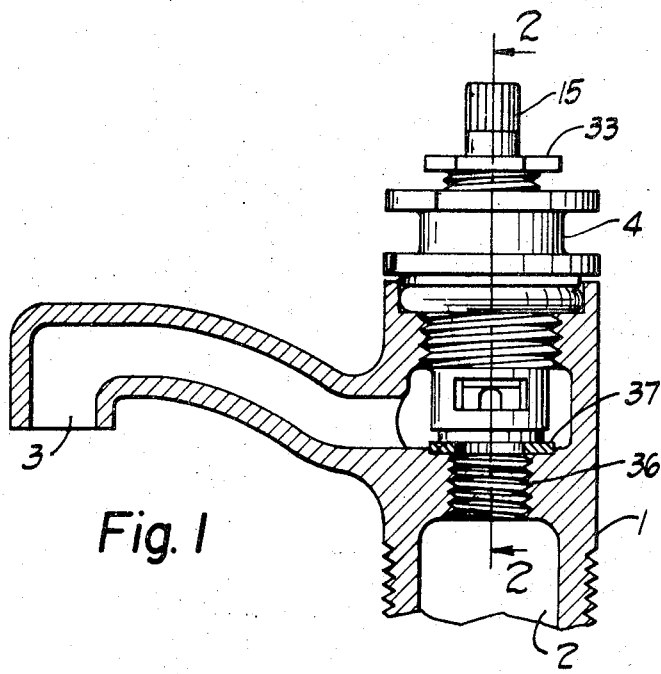
Fig. 1
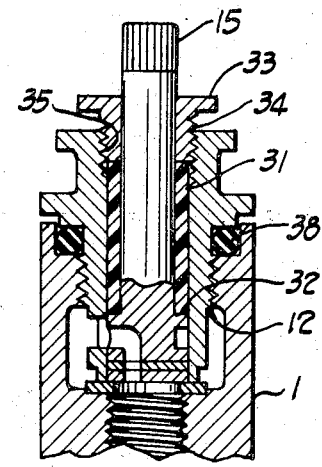
Fig. 2
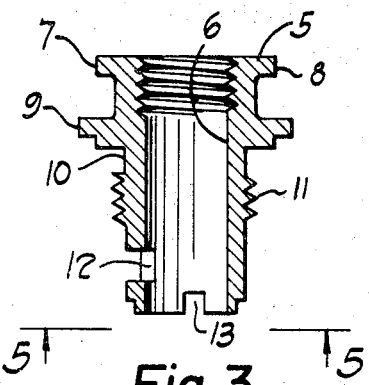
Fig. 3
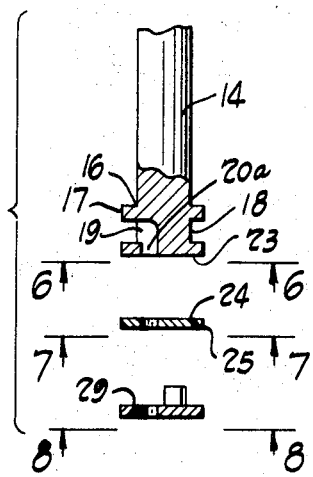
Fig. 4
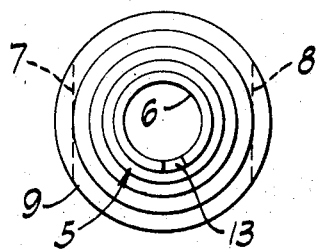
Fig. 5
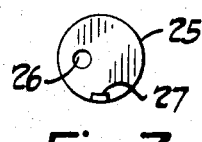
Fig. 6
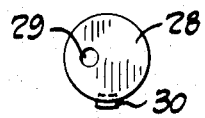
Fig. 7
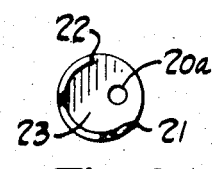
Fig. 8
Fig. 9
INVENTOR
W. E. POLITZ
BY Robb+Robb
ATTORNEYS

CARTRIDGE TYPE VALVE INCLUDING STEM, BONNET AND SEAT

The primary concept of this invention is to simplify valve structure for use in domestic plumbing applications or not limited thereto in which the flow of water is to be controlled within limits, the valve is intended to be constructed for easy replacement of units which are availed of for sealing and regulating of water flow, and simplicity of construction is important since this thereby reduces the probability of leaks and facilitates replacement of various elements when leakage should occur if circumstances result therein.

A particular object of the invention is to construct a valve of the class described in which the stem, bonnet and seat are removable as a cartridge, the seat and its associated seating elements being of disclike form, the stem of simple construction and sealed readily against leakage therearound, all the foregoing being removable and replaceable as circumstances dictate.

A particular object of the invention is to provide a cartridge type arrangement of the class hereinbefore referred to, in which a valve of usual construction may be equipped with a cartridge as contemplated herein, including the flow control unit, by replacing the conventional elements of bonnet, seat and seat washer with those provided hereby.

A particular object of the invention is to provide a seat structure of the class under consideration in which a sealing against undesired flow is effected by flat faces or disclike faces which have interposed therebetween a suitable seal, the seat member itself being of flat construction, flow control being effected by alignment of openings in the respective parts, including a passage through a portion of the stem and directed to the outlet to which flow is desired to be directed.

A specific object of the invention is to provide a sealing unit or member which is comprised of polytetrafluorethylene which has important improvement in sealing function by reason of its relative lubricity which promotes suitable rotation and yet prevents leakage resulting from conventional construction in other types of valves.

Other and further objects of the invention will be understood from a consideration of the specification appended hereto and disclosed in the drawing wherein:

FIG. 1 is a vertical sectional view showing a typical valve embodying the structure hereof.

FIG. 2 is a fragmentary sectional view in further detail showing the construction of the invention.

FIG. 3 is a sectional view to illustrate the bonnet construction.

FIG. 4 is an exploded view illustrating in fragmentary arrangement a portion of the stem, seal and seat member in section to illustrate the relationship thereof when in place in the valve unit.

FIG. 5 is a bottom view of the bonnet of FIG. 3 said bonnet being shown in full lines.

FIG. 6 is a bottom view of the stem taken about on the line 6—6 of FIG. 4 looking in the direction of the arrows.

FIG. 7 is a view taken about on the line 7—7 of FIG. 4 looking in the direction of the arrows, to illustrate the form of seal.

FIG. 8 is a view taken about on the line 8—8 of FIG. 4 looking in the direction of the arrows to disclose the seat in FIG. 8.

FIG. 9 is a view taken about 180° from the view of FIG. 6 and about on the same line, looking at the bottom of the stem to illustrate rotation thereof to a shutoff position.

Referring now to FIG. 1, the valve of this construction includes a valve body 1, which for the purposes hereof may be considered a single or basin cock type of valve for purposes of illustration which includes an inlet at 2 and an outlet at 3 of spoutlike configuration.

The valve control unit of this invention is generally designated at 4 and illustrated in greater detail in the various FIGS. and particularly FIGS. 2 and 3 as embodying a bonnet 5 which is of generally cylindrical configuration having a bore of cylindrical configuration designated 6 extending therethrough from the upper end to the lower end thereof, the upper end being formed with flats at 7 and 8 to provide means for tightening the unit by a wrench, just below said flats 7 and 8 there being an upstanding shoulder 9 of circular configuration having an O-ring seat 10 just therebelow.

Just below the O-ring seat 10 are suitable threads 11 adapted to engage mating threads 11a formed in the interior upper end of the body 1 as disclosed, for purposes which will be apparent as this description proceeds.

Below the threads 11, is a milled slot 12 which provides an opening to the interior of the bonnet 5 and specifically the bore 6 thereof, and through which water flows when the valve is manipulated to effect an opening thereof in a manner to be subsequently explained.

At the lower extremity of the bonnet 5 and within the bore 6 is formed a notch 13 of some depth as illustrated in FIG. 5, and providing rotation limiting means for the stem in a manner which will be understood hereinafter.

Turning to FIG. 2 more specifically and in conjunction with FIGS. 4 through 9, the stem is denoted at 14 being of cylindrical configuration, having at the upper end suitable serrations 15 to which a handle may be applied to effect rotation of the stem.

At the lower end of the stem is a control section generally designated 16, which section includes an upper shoulder 17 of circular configuration extending outwardly from the stem 14, and below which is a flow portion 18 which is in the nature of a peripheral groove and from which extends inwardly and downwardly a passageway 19, said passageway 19 terminating at the lower end in an opening 20a.

Off the lower end of the control section 16 now being described is a further shoulder 20, which as shown in FIG. 6 extends only part way around the periphery of the section and in effect provides stop shoulders 21 and 22 which will limit stem rotation in a manner to be described momentarily, the extreme lower end of the stem 14 terminating in a sealing face 23 which is flat and of very good finish, said sealing face being adapted to engage the upper surface 24 of a seal 25, said seal 25 being a disc as illustrated in FIG. 7 with an opening 26 extending therethrough and a notch 27 at the edge thereof.

The seal 25 is preferably composed of plastic known as polytetrafluorethylene, which has valuable characteristics for the purposes hereof, namely it is extremely slippery or appears to have a slippery feeling and action, is not subject to distortion by water whether hot or cold, and yet is compressible to a sufficient extent to permit the desired sealing effect to be produced under conditions to be subsequently set forth.

The characteristic of the polytetrafluorethylene which limits the swelling and shrinking thereof, is extremely valuable in this type of valve because of the clearance problems and the desire to maintain the valve at a uniform operating torque after the same has initially been established.

Continuing with the description of the sealing arrangement hereof, below the seal 25 is a seat member 28 of disclike configuration generally speaking, and of suitable metallic material in which the upper face thereof 29, is flat to very close tolerances to engage the under face or mating face of the seal 25.

The seat member 28 includes an opening 29 extending therethrough and an upstanding and offstanding ear 30 which as illustrated in FIG. 2, is intended to be seated in the notch 13 of the bonnet 5, likewise engage the notch 27 of the seal 25 and provide for limiting the rotation of the stem 14 between the stops 21 and 22.

When the parts have been assembled as illustrated in FIG. 2, it will be apparent that the lower face 23 of the stem, and specifically the control section 16 thereof, will engage the upper face 24 of the seal 25, and the lower face of the seal 25 will in turn engage the upper face 29 of the seat member 28.

In order to maintain these faces in sealing relationship and permit the relative rotation of the stem 14 with respect thereto, the stem is positioned within the bonnet 5 by a sleevelike seal 31 preferably formed of polytetrafluorethylene as the seal 25 is likewise formed of such material, the lower end 32 of the sleeve 31 engaging the upper portion of the shoulder 17 formed on the stem 14 as by a suitable packing nut 33, which engages by threads 34 formed thereon with mating threads 35 formed in the upper end of the bonnet 5, will permit the sleeve seal 31 to be forced downwardly against the shoulder 17 and thereby maintain the sealing faces previously described in sealing relationship.

It will be apparent that the seal 25 is maintained against rotation with respect to the seat 28 by the provision of the notch 27 in said seal engaging the ear 30 of the seat member 28, which will of course maintain the openings 26 and 29 in alignment.

Since the seat member 28 is restrained against rotation by engagement of the ear 30 with the notch 13 in the bonnet 5, and the stem 14 is permitted to rotate, the opening 20a in the passage 19 may be brought into and out of alignment with the openings 26 and 29 as occasion requires to permit the flow of water from the inlet 2 to the outlet 3 through the openings previously mentioned or to prevent such liquid flow as determined by stem rotation.

It is pointed out that the liquid flow through the passage 19 will enter the flow portion 18 and in turn pass through the milled slot 12 in the bonnet 5 to the area around the bonnet and thus outwardly to the outlet 3.

The structure hereof is illustrated as being placed in a conventional type of valve in which the usual seat would have been mounted in the threads 36, but in this instance, such seat has been removed, the resilient seal 37 positioned at such seat opening, and the lower end of the bonnet 5 as illustrated in FIG. 2, brought into engagement with such seal 37 to prevent leakage therearound.

The O-ring 38 at the upper end of the body 1 of course prevents leakage water around the bonnet when the same is suitably tightened with respect to the said body 1.

I claim:

1. in valve construction of the class described, in combination, a valve body, an inlet and an outlet therefor, and a valve control unit mounted in said body intermediate the inlet and outlet, said unit including a threaded bonnet having a stem receiving bore therein and a lower end extending into the body, a slot in said bonnet adjacent the said end, said slot connecting the bore with the outlet aforesaid, a stem guidingly mounted in said bore, extending therethrough and having an integral control section and flow portion at one end in said bore, said section including a sealing face, a passageway opening at said face at one end and leading to said flow portion, a seat member at said face having an opening therein, said seat member being engaged by said bonnet, and sealing means intermediate said sealing face and member, said means permitting liquid flow through the face and passageway, means to limit stem rotation, rotation of said stem effecting alignment of the openings in the sealing face, seat member and seal, whereby to control liquid flow from the inlet through the flow portion to the outlet aforesaid.

2. The combination as claimed in claim 1, wherein the means to limit stem rotation includes a limiting element in the bonnet, a limiting part on the seat member engaging the same, the seat member in turn being thereby restrained against rotation, and stop means on the stem to engage the limiting part at opposite rotative positions to define open and closed positions determined by stem rotation.

3. The combination as claimed in claim 1, wherein the means to limit stem rotation includes a limiting element in the bonnet, a limiting part on the seat member engaging the same, the seat member in turn being thereby restrained against rotation, and stop means on the stem to engage the limiting part at opposite rotative positions to define open and closed positions determined by stem rotation, and the sealing means is of disclike configuration, including a portion to engage the limiting part on the seat member whereby such seal is restrained against rotation.

4. The combination as claimed in claim 1, wherein the means to limit stem rotation includes a limiting element in the bonnet, a limiting part on the seat member engaging the same, the seat member in turn being thereby restrained against rotation, and stop means on the stem to engage the limiting part at opposite rotative positions to define open and closed positions determined by stem rotation, and the sealing means is of disclike configuration, including a portion to engage the limiting part on the seat member whereby such seal is restrained against rotation, said sealing means being comprised of a material having the characteristics of polytetrafluorethylene.

5. The combination as claimed in claim 1, wherein the means to limit stem rotation includes a limiting element in the bonnet, a limiting part on the seat member engaging the same, the seat member in turn being thereby restrained against rotation, and stop means on the stem to engage the limiting part at opposite rotative positions to define open and closed positions determined by stem rotation, and the sealing means is of disclike configuration, including a portion to engage the limiting part on the seat member whereby such seal is restrained against rotation, said sealing means being comprised of polytetrafluorethylene.

6. The combination as claimed in claim 1, wherein the means to limit stem rotation includes a limiting element in the bonnet, a limiting part on the seat member engaging the same, the seat member in turn being thereby restrained against rotation, and stop means on the stem to engage the limiting part at opposite rotative positions to define open and closed positions determined by stem rotation, and the sealing means is of disclike configuration formed of polytetrafluorethylene, includes a portion to engage the limiting part of the seat member to restrain said seal from rotation when the stem is rotated.